United States Patent
Xu

(10) Patent No.: US 11,221,602 B2
(45) Date of Patent: Jan. 11, 2022

(54) SUPER-LINEAR APPROXIMATION OF DYNAMIC PROPERTY VALUES IN A PROCESS CONTROL ENVIRONMENT

(71) Applicant: AVEVA SOFTWARE, LLC, Lake Forest, CA (US)

(72) Inventor: Gang Xu, Irvine, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 880 days.

(21) Appl. No.: 14/919,887

(22) Filed: Oct. 22, 2015

(65) Prior Publication Data

US 2017/0115644 A1 Apr. 27, 2017

(51) Int. Cl.
*G05B 17/02* (2006.01)

(52) U.S. Cl.
CPC .................................. *G05B 17/02* (2013.01)

(58) Field of Classification Search
CPC ...................................................... G05B 17/02
See application file for complete search history.

(56) References Cited

U.S. PATENT DOCUMENTS

| | | | | |
|---|---|---|---|---|
| 5,504,692 | A * | 4/1996 | Gardner | G01F 15/068 700/266 |
| 6,323,882 | B1 * | 11/2001 | Jerome | G05B 19/41865 715/744 |
| 6,442,515 | B1 | 8/2002 | Varma et al. | |
| 7,519,506 | B2 * | 4/2009 | Trias | H02J 3/00 700/286 |
| 7,676,352 | B1 * | 3/2010 | Van Peursem | G05B 17/02 137/828 |
| 7,987,082 | B2 | 7/2011 | Van Peursem et al. | |
| 2009/0076773 | A1 * | 3/2009 | Dong | G05B 13/048 702/179 |
| 2010/0023464 | A1 * | 1/2010 | Danai | G05B 17/02 706/12 |
| 2011/0066285 | A1 * | 3/2011 | Xu | G06F 17/5004 700/266 |
| 2011/0167025 | A1 * | 7/2011 | Danai | G05B 17/02 706/12 |
| 2012/0259605 | A1 * | 10/2012 | Boys | G06F 17/5009 703/9 |

(Continued)

OTHER PUBLICATIONS

Horne et al, "Modelling of Chemical Processes Using S-Systems", Jan. 2006, pp. 1-6, downloaded from the internet https://www.researchgate.net/profile/Mark-Willis/publication/252725216_MODELLING_OF_CHEMICAL_PROCESSES_USING_S-SYSTEMS (Year: 2006).*

(Continued)

*Primary Examiner* — Rocio Del Mar Perez-Velez
*Assistant Examiner* — Olvin Lopez Alvarez
(74) *Attorney, Agent, or Firm* — Greenberg Traurig, LLP

(57) ABSTRACT

Simulation of process control environments, including dynamic properties, with a modified first-order Taylor series expansion. By using more linear calculations, a physical dynamic property is approximated in less time and with fewer computing resources. By adjusting the approximation to introduce curvature, a physical dynamic property is represented over a wider range than with basic linear series expansions. A comparison to a basic linear first-order series expansion identifies conditions when a rigorous update of a dynamic property is needed.

5 Claims, 7 Drawing Sheets

(56) References Cited

U.S. PATENT DOCUMENTS

| | | | | |
|---|---|---|---|---|
| 2013/0211601 | A1* | 8/2013 | Cheng | G06F 17/5018 |
| | | | | 700/282 |
| 2014/0214217 | A1* | 7/2014 | Bonne | G05D 23/19 |
| | | | | 700/281 |
| 2015/0346704 | A1* | 12/2015 | Tabaru | G06F 17/11 |
| | | | | 700/29 |
| 2017/0176983 | A1* | 6/2017 | Tetiker | G05B 19/4188 |
| 2020/0074021 | A1* | 3/2020 | Boys | G06F 30/20 |

OTHER PUBLICATIONS

Kunovsky et al., "Initial Problems with Polynomials on Right-hand Sides", 2009, p. 6 downoaded from the internet https://ieeexplore.ieee.org/document/5071980 (Year: 2009).*

Colosi et al., "The Taylor Series—Local Iterative Linearization Method for Numerical Modeling and Simulation of Linear Processes", 2008, p. 4. Downloaded from the internet https://ieeexplore ieee .org/document/4588825 (Year: 2008).*

W Horne et al, "Modelling of Chemical Processes Using S-Systems", 2006, pp. 6 downloaded from the internet https://www.researchgate.net/publication/252725216_ MODELLING _OF_ CHEMICAL_ PROCESSES _USING_S-SYSTEMS (Year: 2006).*

Wikipedia, "equation solving", 2020, p. 7. Downloaded from wikipedia.com (Year: 2020).*

* cited by examiner

SUPER-LINEAR APPROXIMATION OF DYNAMIC PROPERTY VALUES IN A PROCESS CONTROL ENVIRONMENT

BACKGROUND

Aspects of the present invention generally relate to property models used by simulation, optimization, and related applications. More particularly, aspects of the present invention relate to systems and methods for determining values of dynamic properties in industrial processes in less time than existing solutions.

Dynamic process simulation typically involves performing calculations using dynamic property functions, which can be extremely computationally intensive. One technique that has been utilized in an effort to reduce the computational burden associated with calculating dynamic property functions includes substituting an approximation for the functions. One such approximation, known as a Taylor series expansion, permits the extrapolation of a function given a reference point and independent variable sensitivity about that point. Existing solutions often require use of a second-order Taylor series expansion in approximation calculations, which is time-consuming and computationally intensive.

SUMMARY

Aspects of the invention permit super-linear approximation, which does not require calculating second-order derivatives and represents real properties over a much wider range than existing solutions.

A method embodying aspects of the invention includes simulating with a simulation module a continuous process that uses a dynamic equation representing a dynamic property of the continuous process. In the method, a local module determines a super-linear approximate value of the dynamic property. The super-linear approximate value is based on only first-order derivatives of a series expansion of the dynamic equation and is automatically updated over the continuous process. Using the simulation module, the method continues by determining a solution for the dynamic equation based on the super-linear approximate value. One or more devices of the continuous process are then controlled based on the determined solution.

Moreover, using the local module, the method continues by determining an error value between at least two terms of the series expansion and updating the super-linear approximate value with a rigorous value when the determined error value is greater than a predetermined value.

A processor-readable medium embodying aspects of the invention has processor-executable instructions stored thereon that, when executed, perform a method of generating a super-linear approximate value of a dynamic physical property associated with an industrial process. The method includes receiving one or more values of a dynamic physical property associated with an industrial process. The method also includes generating a first-order series expansion of a dynamic equation relating to the dynamic physical property. The method further includes generating a super-linear approximate value of the dynamic physical property based at least in part on the first-order series expansion and updating the super-linear approximate value over a range of values of the dynamic physical property. A simulation module simulates the industrial process based at least in part on the dynamic equation solved as a function of the super-linear approximate value.

A system embodying aspects of the invention includes a subtraction-differentiation module, a negation module, a logarithm-subtraction-differentiation module, and a first summation module. The subtraction-differentiation module is adapted to perform a subtraction operation and a differentiation operation on previous and current property values. The negation module is adapted to perform a negation operation on results of the subtraction-differentiation module. The logarithm-subtraction-differentiation module is adapted to perform logarithm, subtraction, and differentiation operations on the previous and current property values. The first summation module is adapted to perform an addition operation on results of the subtraction-differentiation module, the negation module, and the logarithm-subtraction-differentiation module as well as a result of a previous rigorously calculated property value in order to generate a current super-linear approximate property value. A processor is adapted to perform a simulation of an industrial process based at least in part on a dynamic equation solved as a function of the current super-linear approximate value Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
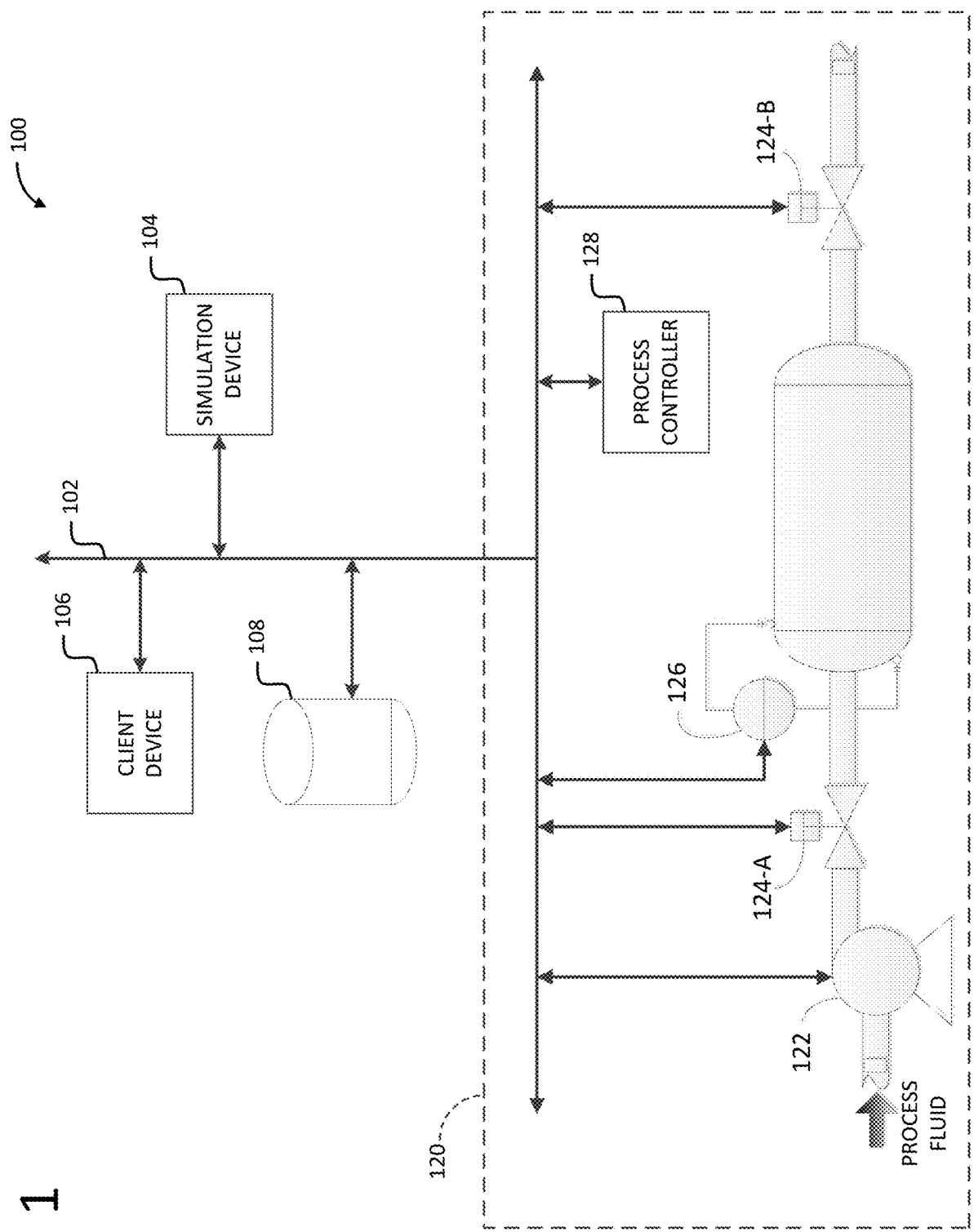
FIG. 1 illustrates an exemplary industrial process system within which aspects of the invention may be incorporated.

FIG. 1 illustrates an exemplary system 100 within which an embodiment of the invention may be incorporated. The system 100 includes a communication infrastructure 102, a simulation device 104, a client device 106, a computer-readable storage medium 108, and an exemplary fluid processing system 120. The fluid processing system 120 of the exemplary embodiment of FIG. 1 further includes a pump 122, valves 124, a sensor 126, and a process controller 128. In system 100, the simulation device 104, the client device 106, the storage medium 108, and various components of the fluid processing system 120 (e.g., pump 122, valves 124, sensor 126, process controller 128) are communicatively connected via the communication infrastructure 102.

The communication infrastructure 102 is capable of facilitating the exchange of data among various components of system 100, including simulation device 104, client device 106, storage medium 108, and components of fluid processing system 120. The communication infrastructure 102 in the embodiment of FIG. 1 is a local area network (LAN) that is connectable to other telecommunications networks, including other LANs or portions of the Internet or an intranet. The communication infrastructure 102 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communication infrastructure 102 is any medium that allows data to be physically transferred through serial or parallel communication channels (e.g., copper, wire, optical fiber, computer bus, wireless communication channel, etc.). In an embodiment, communication infrastructure 102 comprises at least in part a process control network.

The simulation device 104 is adapted to provide dynamic simulation, optimization, and other capabilities with respect to industrial and other continuous processes (e.g., fluid processing system 120). In the exemplary embodiment of FIG. 1, simulation device 104 executes processor-executable instructions embodied on a storage memory device to provide the dynamic simulation and other capabilities via a software environment, as further described herein. In an embodiment, simulation device 104 is any computing device capable of executing processor-executable instructions including, but not limited to, one or more servers.

Referring further to FIG. 1, the client device 106 is adapted to provide access to simulation device 104. In an embodiment, client device 106 is a computing device that includes a graphical user interface (GUI) adapted to facilitate interaction with models, dynamic simulations, optimizations, and other capabilities of simulation device 104. In another embodiment, client device 106 includes a GUI adapted to display results of dynamic simulations and optimizations performed by simulation device 104. The client device 106 may be any computing device capable of executing processor-executable instructions including, but not limited to, personal computers, laptops, workstations, tablets, smartphones, mobile devices, and the like. Further details regarding client devices are provided in, for example, U.S. Pat. Nos. 7,676,352 and 7,987,082, each of which is hereby incorporated by reference in its entirety.

The storage medium 108 of FIG. 1 is adapted for storing and providing (e.g., receiving and transmitting) data among various components of system 100. In an exemplary embodiment, simulation device 104, client device 106, and process controller 128 utilize storage medium 108 as a central repository for data rather than sending and receiving data directly among themselves. In an embodiment, storage medium 108 is an organized collection of data (i.e., a database) stored on storage memory devices of one or more server computing devices. In an embodiment, storage medium 108 comprises simulation device 104. In another embodiment, storage medium 108 is provided as a "cloud" database.

Still referring to FIG. 1, the fluid processing system 120 is adapted for changing or refining raw materials to create end products. It will be apparent to one skilled in the art that aspects of the present invention are capable of optimizing processes and processing systems other than fluid processing system 120 and that system 120 is presented for illustration purposes only. Additional exemplary processes include, but are not limited to, those in the chemical, oil and gas, food and beverage, pharmaceutical, water treatment, and power industries. In an embodiment, process controller 128 provides an interface or gateway between components of fluid processing system 120 (e.g., pump 122, valves 124, sensor 126) and other components of system 100 (e.g., simulation device 104, client device 106, storage medium 108). In another embodiment, components of fluid processing system 120 communicate directly with simulation device 104, client device 106, and storage medium 108 via communication infrastructure 102. In yet another embodiment, process controller 128 transmits data to and receives data from pump 122, valves 124, and sensor 126 for controlling and/or monitoring various aspects of fluid processing system 120.

Figure 2:
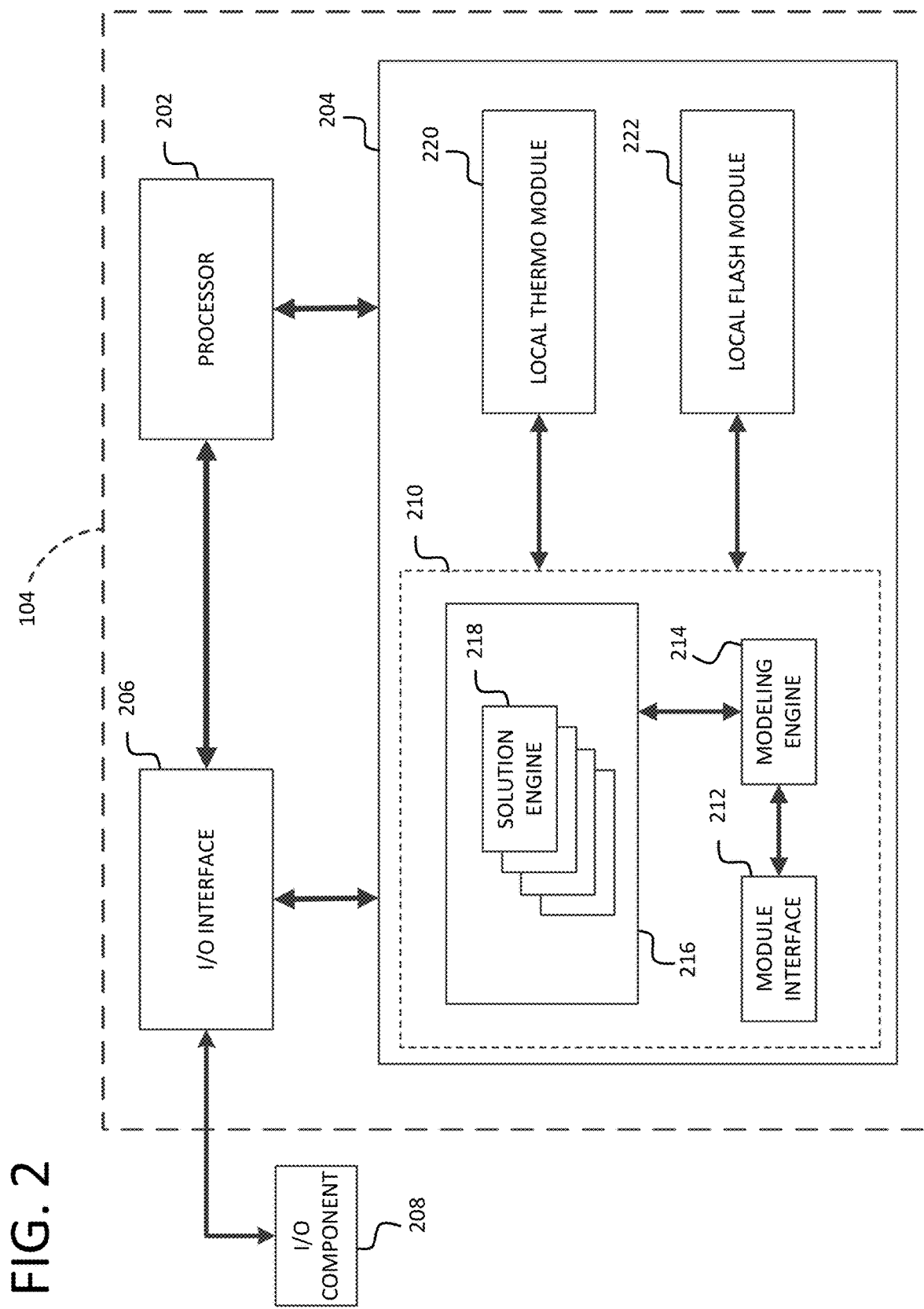
FIG. 2 illustrates an exemplary architecture of a computing device programmed to provide aspects of a simulation module and a local thermodynamic module according to an embodiment of the invention.

FIG. 2 illustrates an exemplary architecture of simulation device 104. In this embodiment, simulation device 104 includes a processor 202, a memory 204, and an input/output (I/O) interface 206 that is adapted to interface with an I/O device 208. The memory 204 includes a simulation module 210, which further includes a module interface 212, a modeling engine 214, and a solver 216. The solver 216 in turn further includes one or more solution engines 218. The memory 204 also includes a local thermodynamic (i.e., "thermo") module 220, and a local flash module 222.

Referring further to FIG. 2, processor 202, memory 204, and I/O interface 206 are communicatively connected and/or electrically connected to each other. The I/O interface 206 is communicatively and/or electrically connected to I/O device 208. The processor 202 is adapted to execute processor-executable instructions stored in memory 204 for implementing simulation module 210, module interface 212, modeling engine 214, solver 216, solutions engines 218, local thermo module 220, and/or local flash module 222.

The I/O interface 206 of FIG. 2 is adapted to provide a data connection between simulation device 104 and I/O device 208. In embodiments of the invention, I/O interface 206 is a network interface card (NIC) or modem and I/O device 208 is a telecommunications network. In another embodiment, I/O device 208 is at least one of a keyboard, a mouse, and a touchscreen and I/O interface 206 is an integrated circuit that allows data to be physically transferred through serial or parallel communication channels.

The simulation module 210 of FIG. 2 is adapted to provide a dynamic simulation environment capable of simulating various aspects of fluid processing system 120. An exemplary dynamic simulation environment within which aspects of the present invention may be incorporated is provided by the DYNSIM™ simulation application available from Schneider Electric. Further details regarding simulation modules are provided in, for example, U.S. Pat. Nos. 7,676,352 and 7,987,082, each of which has been incorporated by reference in its entirety.

The module interface 212 of FIG. 2 is adapted to provide a connection between client device 106 and simulation module 210. In an exemplary embodiment, module interface 212 allows a GUI of client device 106 to facilitate interaction with models, dynamic simulations, optimizations, and other capabilities of simulation module 210. In another embodiment, module interface 212 facilitates displaying results of dynamic simulations and optimizations performed by simulation module 210 on a GUI of client device 106. The module interface 212 allows the actual implementation of architectural objects, such as a GUI of client device 106, to be independent of the surrounding architecture, such as the operating system and network technology, in accordance with certain aspects of the invention. In an embodiment, module interface 212 is the Interface Definition Language (IDL) as specified in the CORBA/IIOP 2.2 specification. It will be apparent to one skilled in the art that module interface 212 may conform to other and/or additional standards, or even be non-existent.

Still referring to FIG. 2, modeling engine 214 provides an environment for building and solving process models that correspond to aspects of fluid processing system 120. In an embodiment, modeling engine 214 comprises data structures that define model elements corresponding to fluid processing system 120, a flowsheet manager, and an event handler. In another embodiment, modeling engine 214 provides an open form of model equations to solution engines 218. In yet another embodiment, modeling engine 214 provides a closed form of model equations to solution engines 218. In accordance with aspects of the invention, modeling engine 214 further includes a model generator that creates a mathematical model of process models of the modeling engine 214 for input to the solution engines 218. In the exemplary embodiment, the mathematical model is a set of equations and variables that comprehensively model all or part of the process (e.g., fluid processing system 120). Exemplary mathematical models include those in the form of a matrix that represents the equations in the process model in the form f(x)=0. In exemplary embodiments, the equations comprise those related to mass, material, equilibrium, thermodynamic, and physical properties applicable to all or part of the modeled process (e.g., fluid processing system 120). Further details regarding creation, modification, and alteration of flowsheet models are provided in, for example, U.S. Pat. Nos. 6,442,515, 6,323,882, 7,676,352, and 7,987,082, each of which has been incorporated by reference in its entirety.

The solver 216 of FIG. 2 provides a solution algorithm for solving a process model generated by modeling engine 214. In an embodiment, solver 216 is Opera, a solver available from Schneider Electric as part of the ROMeo System. Further details regarding solvers are provided in, for example, U.S. Pat. Nos. 7,676,352 and 7,987,082, each of which has been incorporated by reference in its entirety.

Referring yet again to FIG. 2, the solution engines 218 are utilized by solver 216 for solving different process models (e.g., equations modeling a process). In an embodiment, each model in modeling engine 214 has a corresponding solution engine 218 such that multiple solution engines 218 may execute at the same time within solver 216. In accordance with another embodiment, solution engines 218 are implemented as generalized matrix solvers utilizing Harwell subroutines. Further details regarding solution engines are provided in, for example, U.S. Pat. Nos. 7,676,352 and 7,987,082, each of which has been incorporated by reference in its entirety.

With continued reference to FIG. 2, the local thermo module 220 is adapted to operate in conjunction with various aspects of simulation module 210 to calculate a local thermodynamic property of a relevant model and determine the deviation of the model from a reference value (e.g., an initial value). In another embodiment, local thermo module 220 is adapted to update the local thermodynamic property of the relevant model (e.g., an automatic rigorous update of the model to reduce the amount of deviation from the reference value). Consistent with aspects of the invention, local thermo module 220 utilizes a modified first-order Taylor series expansion in the domains of certain thermodynamic properties that introduces curvature to represent the real property calculation in a much wider range than conventional solutions. In an embodiment, calculations performed utilizing the modified first-order Taylor series expansion is referred to as super-linear approximation. The modified first-order Taylor series expansion also enables local thermo module to determine deviations from a reference value of the property and initiate a rigorous update of the thermodynamic property value in simulation module 210. The local thermo module 220 of FIG. 2 is provided as processor-executable instructions that comprise a procedure, a function, a routine, a method, and/or a subprogram of simulation module 210 according to an exemplary embodiment of the invention. Further details regarding local thermo module 220 are provided herein.

The local flash module 222 of FIG. 2 is adapted to operate in conjunction with various aspects of simulation module 210 to calculate a flash condition of the relevant model. In an aspect, local flash module 222 is provided as processor-executable instructions that comprise a procedure, a function, a routine, a method, and/or a subprogram of simulation module 210. Further details regarding local flash modules are provided in, for example, U.S. Pat. Nos. 7,676,352 and 7,987,082, each of which has been incorporated by reference in its entirety. As described above, aspects of the present invention advantageously overcome the need for second order derivatives used in earlier models.

During an exemplary operation of simulation device 104 (e.g., execution of processor executable instructions stored in memory 204 by processor 202 that comprise simulation module 210), simulation module 210 effects a simulation of a process model defined by modeling engine 214 that represents fluid processing system 120. The simulation by simulation module 210 is one level (e.g., "top" level) of a multi-level simulation hierarchy. The simulation module 210 utilizes equations, the variables (e.g., pressure, temperature, composition, etc.) of which are assumed to have at least been initialized, although the values of such variables may have not yet converged upon a correct solution of the equations. For example, simulation module 210 may be assumed to have defined values for the variables characterizing aspects of the process model simulating fluid processing system 120. During further operation of simulation module 210, calls are made to local thermo module 220 and local flash module 222 in order to calculate values of various properties at identified aspects of the process model. For example, local thermo module 220 and local flash module 222 may include embedded mass and energy balance equations that comprise another level (e.g., "lower" level) of the multi-level simulation hierarchy. Further details regarding calls made to local thermo module 220 are described herein. Using the calculated values received from local thermo module 220 and local flash module 222, simulation module 210 computes a new solution for the values of the variables characterizing the identified aspects of the process model. This process is then repeated until simulation module 210 determines that the values of the variables have converged upon a correct solution.

Figure 3:
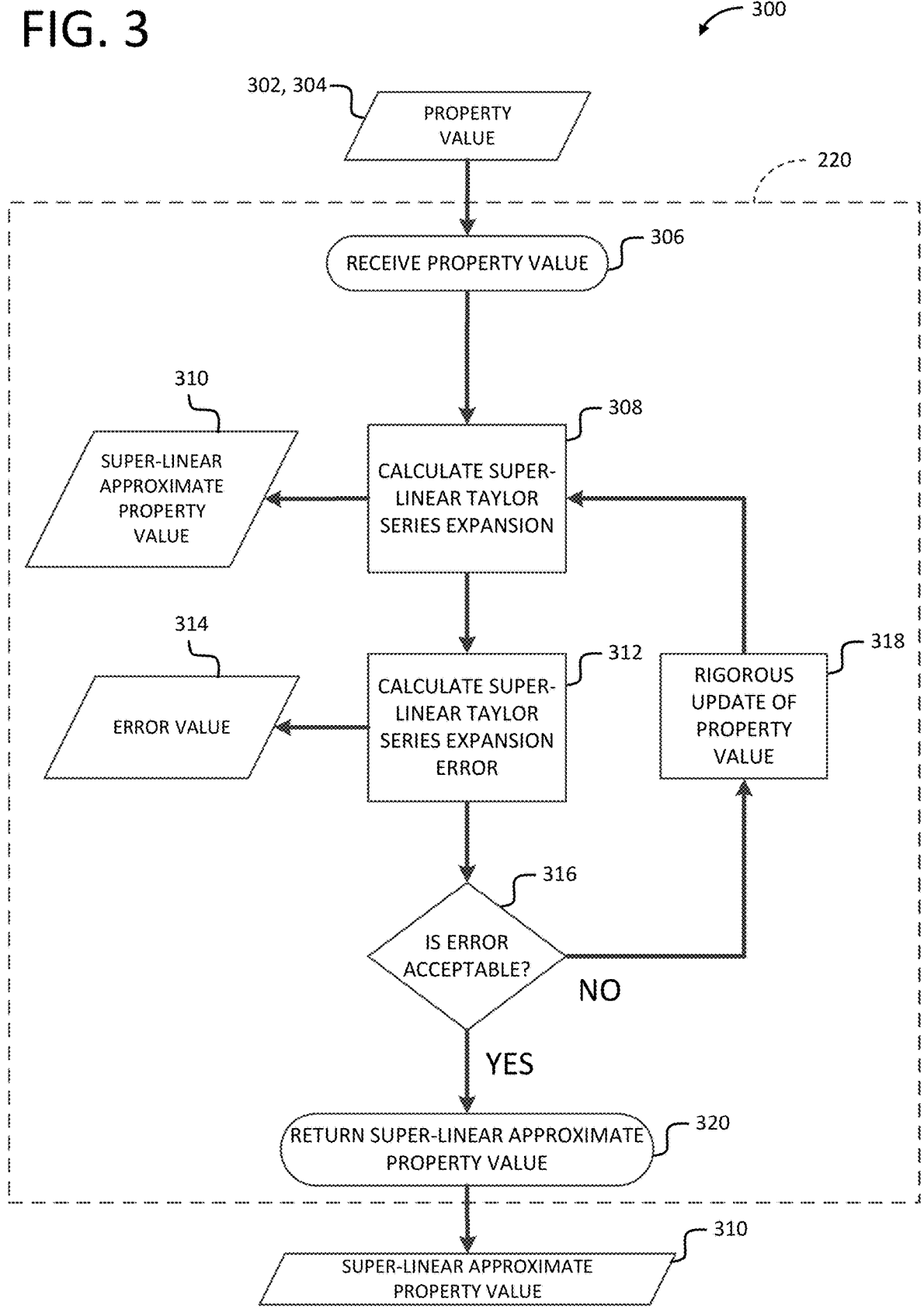
FIG. 3 is an exemplary flow diagram illustrating an operation of the local thermodynamic module of FIG. 2.

FIG. 3 illustrates a flow diagram of an exemplary execution of a super-linear approximation process 300 by local thermo module 220. In an embodiment, an execution of simulation module 210 includes a call from simulation module 210 to local thermo module 220 that directs local thermo module 220 to perform super-linear approximation process 300. Super-linear approximation process 300 may also be referred to as a procedure, a function, a routine, a method, or a subprogram of an execution of processor-executable instructions comprising simulation module 210, according to aspects of the invention.

At step 306, local thermo module 220 receives one or more property values 302, 304 from simulation module 210. In an embodiment, the property values are a previous independent property value 302, which represents the property value during a previous time period, and a current independent property value 304, which represents the property value during a current time period. Step 306 is accomplished in an embodiment by processor 202 executing processor-executable instructions that comprise simulation module 210 directing that the property value is passed as an argument to processor-executable instructions that comprise local thermo module 220. In another embodiment, step 306 is accomplished by processor 202 executing processor-executable instructions that comprise simulation module 210 directing that a reference, such as an address location of memory 204, is passed as an argument to processor-executable instructions that comprise local thermo module 220. In the embodiment of FIG. 3, the property values 302, 304 are a given thermodynamic property (e.g., temperature, pressure, and the like) of fluid processing system 120. In alternative embodiments, the property may be any dynamic property of a physical system.

At step 308, local thermo module 220 calculates a super-linear Taylor series expansion of the received property values to result in a super-linear approximate property value 310. In an embodiment, the super-linear Taylor series expansion is a modified first-order Taylor series expansion that introduces curvature to represent the real property calculation in a wider range of process conditions than a conventional first-order Taylor series expansion. In an exemplary single-variable embodiment, the super-linear Taylor series expansion is represented by Equation 1:

$$y_1 = y_0 + (x_1 - x_0)\left(\frac{dy}{dx}\right) - (x_1 - x_0)\left(\frac{dy}{dx}\right) + (\ln x_1 - \ln x_0)\left(\frac{dy}{d\ln x}\right) \quad (1)$$

which simplifies to Equation 2:

$$y_1 = y_0 + (\ln x_1 - \ln x_0)\left(\frac{dy}{d\ln x}\right) \quad (2)$$

In another exemplary multi-variable embodiment, the super-linear Taylor series expansion is represented by Equation 3:

$$X(T, P, n_i) = X(T_0, P_0, n_{i,0}) + (T^{-1} - T_0^{-1})\left(\frac{\partial X}{\partial T_0^{-1}}\right) + \quad (3)$$
$$(\ln P - \ln P_0)\left(\frac{\partial X}{\partial \ln P_0}\right) + \sum_i (n_i^2 - n_{i,0}^2)\left(\frac{\partial X}{\partial n_{i,0}^2}\right)$$

In an embodiment, step 308 is accomplished by processor 202 executing processor-executable instructions stored in memory 204 that comprise local thermo module 220 for calculating the super-linear Taylor series expansion. Further details regarding calculation of the super-linear Taylor series expansion during step 308 are described herein.

Referring further to Equation 2, the super-linear approximate value is based on first-order derivatives of a series expansion of the dynamic equation and is automatically updated over the continuous process. In an embodiment, the approximated super-linear value is updated with a "true" rigorous value if an error was detected to be significant enough. This error is, for example, the difference between the super-linear value and a simple-linear value. If the super-linear form is represented by Equation 2, above, the simple linear form is:

$$y_1 = y_0 + (x_1 - x_0)\left(\frac{dy}{dx}\right) \quad (4)$$

Thus, if the difference between the two forms is significant enough (user adjustable), then $y_1$ is calculated by the original thermodynamic model, which represents a "rigorous" model, such as shown in Equation 1, without canceling the second and third terms on the right-hand-side of "=" sign. Moreover, when an update occurs, the newly calculated $y_1$ by the rigorous thermodynamic model is used as $y_0$ for further super-linear approximation.

At step 312, local thermo module 220 calculates an error value 314 representing the difference between the calculated super-linear Taylor series expansion and a basic linear first-order Taylor series expansion of the property. In accordance with aspects of the invention, the first and second terms of Equation 1 are equivalent to a basic linear first-order Taylor series expansion of the property and the third and fourth terms of Equation 1 are equivalent to a second-order derivative of the Taylor series expansion. In an embodiment, step 312 is accomplished by processor 202 executing processor-executable instructions stored in memory 204 that comprise local thermo module 220 for calculating the error value 314 representing the "error," i.e., difference, between the super-linear and basic linear Taylor series expansions. In an exemplary embodiment, the error is represented by Equation 5:

$$\text{error} = -\left((x_1 - x_0)\left(\frac{dy}{dx}\right)\right) + \left((\ln x_1 - \ln x_0)\left(\frac{dy}{d\ln x}\right)\right) \quad (5)$$

In another exemplary multi-variable embodiment, the error is represented by Equation 6:

$$\text{error} = -\left((T - T_0)\left(\frac{\partial X}{\partial T_0}\right) + (P - P_0)\left(\frac{\partial X}{\partial P_0}\right) + \sum_i (n_i - n_{i,0})\left(\frac{\partial X}{\partial n_{i,0}}\right)\right) + \quad (6)$$
$$\left(\begin{array}{l}(T^{-1} - T_0^{-1})\left(\frac{\partial X}{\partial T_0^{-1}}\right) + \\ (\ln P - \ln P_0)\left(\frac{\partial X}{\partial \ln P_0}\right) + \sum_i (n_i^2 - n_{i,0}^2)\left(\frac{\partial X}{\partial n_{i,0}^2}\right)\end{array}\right)$$

Further details regarding calculation of the error at step 312 are described herein.

Still referring to FIG. 3, local thermo module 220 determines whether the calculated error value 314 is acceptable at step 316. In an embodiment, local thermo module 220 compares the absolute value of the first and second terms of Equation 1 to the absolute value of the third and fourth terms of Equation 1, as further described herein. And step 316 is accomplished in an embodiment by processor 202 executing processor-executable instructions stored in memory 204 that comprise local thermo module 220 for determining whether error value 314 is acceptable. The local thermo module 220 is configurable to determine error value 314 is acceptable when it is equal to or less than a predetermined criteria (e.g., threshold value provided by client device 106) and not acceptable when it is greater than the predetermined criteria.

When local thermo module 220 determines that error value 314 is not acceptable at step 312 (e.g., the error is greater than a predetermined threshold value), local thermo module 220 performs a rigorous update of the indicated property at step 318 before proceeding back to step 308. In an embodiment, step 318 is accomplished by processor 202 executing processor-executable instructions stored in memory 204 that comprise local thermo module 220 for rigorously updating the current independent property value 304. When local thermo module 220 determines that the error is acceptable at step 316 (e.g., the error is equal to or less than a predetermined threshold value), local thermo module 220 returns the super-linear approximate property value 310 to simulation module 210 at step 320. In an embodiment, step 320 is accomplished by processor 202 executing processor-executable instructions that comprise local thermo module 220 directing that super-linear approximate property value 310 is passed as an argument to processor-executable instructions that comprise simulation module 210. In another embodiment, step 320 is accomplished by processor 202 executing processor-executable instructions that comprise local thermo module 220 directing that a reference, such as an address location of memory 204, is passed as an argument to processor-executable instructions that comprise simulation module 210.

Figure 4:
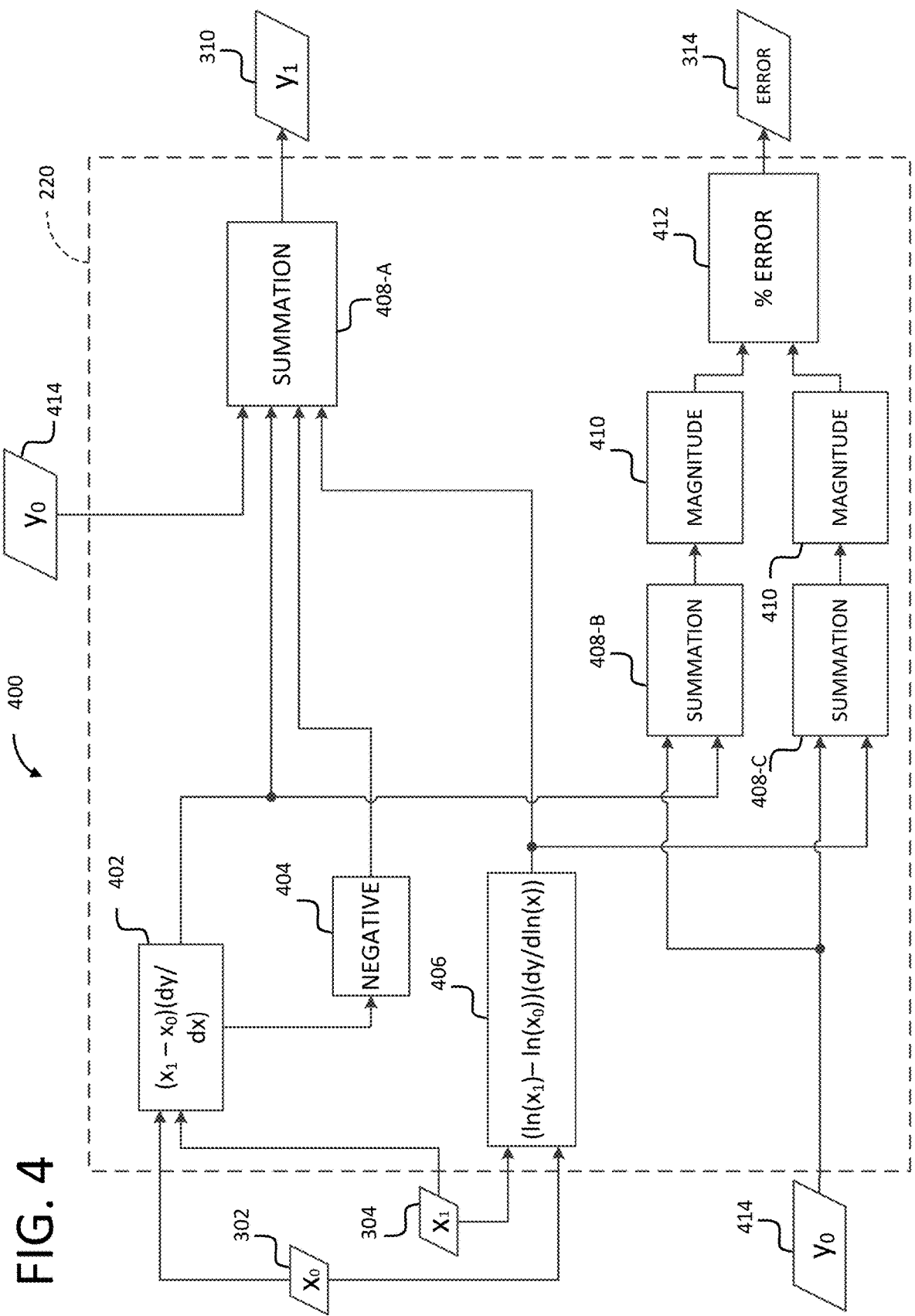
FIG. 4 is an exemplary block diagram illustrating an embodiment of the local thermodynamic module of FIG. 2.

FIG. 4 illustrates a block diagram of a super-linear approximation system 400 that comprises, at least in part, an exemplary embodiment of local thermo module 220. The super-linear approximation system 400 includes a subtraction-differentiation module 402, a negation module 404, a logarithm-subtraction-differentiation module 406, summation modules 408, magnitude modules 410, and an error module 412.

The subtraction-differentiation module 402 is adapted to receive inputs, perform subtraction and differentiation operations on the received inputs, and output a result. In accordance with aspects of the invention, subtraction-differentiation module 402 receives data and/or signals indicative of previous independent property value 302 (e.g., $x_0$) and current independent property value 304 (e.g., $x_1$). The subtraction-differentiation module 402 performs a subtraction operation to subtract previous independent property value 302 from current independent property value 304 (e.g., $x_1-x_0$). The subtraction-differentiation module 402 then differentiates the result of the subtraction operation (e.g., $(x_1-x_0)(dy/dx)$) and provides data and/or a signal indicative of the differentiated result as an output value. In an embodiment, the subtraction operation performed by subtraction-differentiation module 402 is accomplished by processor 202 executing processor-executable instructions that comprise local thermo module 220. In another embodiment, the subtraction operation performed by subtraction-differentiation module 402 is accomplished by a circuit including resistors and an operational amplifier (i.e., op-amp) configured as a difference amplifier, as will be apparent to one skilled in the art. In an embodiment, the differentiation operation performed by subtraction-differentiation module 402 is accomplished by processor 202 executing processor-executable instructions that comprise local thermo module 220. In another embodiment, the differentiation operation performed by subtraction-differentiation module 402 is accomplished by a circuit including resistors, capacitors, and an op-amp configured as a differentiator (e.g., active high-pass filter), as will be apparent to one skilled in the art.

The negation module 404 is adapted to receive inputs, perform a negation operation, and output a result. In an embodiment, negation module 404 receives data and/or a signal indicative of a value of the output of subtraction-differentiation module 402, negates the received value (e.g., $-(x_1-x_0)(dy/dx)$), and outputs data and/or a signal indicative of the value of the result. In an embodiment, the negation operation performed by negation module 404 is accomplished by processor 202 executing processor-executable instructions that comprise local thermo module 220. In another embodiment, the negation operation performed by negation module 404 is accomplished by a circuit including resistors and an op-amp configured as an inverting amplifier, as will be apparent to one skilled in the art.

The logarithm-subtraction-differentiation module 406 is adapted to receive inputs, perform logarithm, subtraction, and differentiation operations on the received inputs, and output a result. In an embodiment, logarithm-subtraction-differentiation module 406 receives data and/or a signal indicative of previous independent property value 302 (e.g., $x_0$) and current independent property value 304 (e.g., $x_1$). The logarithm-subtraction-differentiation module 406 determines a value of the logarithm of each of previous independent property value 302 (e.g., $\ln(x_0)$) and current independent property value 304 (e.g., $\ln(x_1)$). The logarithm operations performed by logarithm-subtraction-differentiation module 406 are accomplished in an embodiment by processor 202 executing processor-executable instructions that comprise local thermo module 220. In another embodiment, the logarithm operations performed by logarithm-subtraction-differentiation module 406 are accomplished by a circuit including resistors, a diode, and an op-amp configured as a logarithmic amplifier, as will be apparent to one skilled in the art. The logarithm-subtraction-differentiation module 406 then performs a subtraction operation on the logarithm values of previous independent property value 302 from the logarithm of current independent property value 404 (e.g., $(\ln(x_1)-\ln(x_0))$). In accordance with aspects of the invention, the subtraction operation performed by logarithm-subtraction-differentiation module 406 may be accomplished by processor 202 executing processor-executable instructions that comprise local thermo module 220 or by a circuit including resistors and an operational amplifier (i.e., op-amp) configured as a difference amplifier, as further described herein. The logarithm-subtraction-differentiation module 406 then differentiates the result of the subtraction operation (e.g., $(\ln(x_1)-\ln(x_0))(dy/d\ln(x))$). In accordance with aspects of the invention, the differentiation operation performed by logarithm-subtraction-differentiation module 406 may be accomplished by processor 202 executing processor-executable instructions that comprise local thermo module 220 or by a circuit including resistors, capacitors, and an op-amp configured as a differentiator as further described herein. The logarithm-subtraction-differentiation module 406 then provides data and/or a signal indicative of the result as an output value.

The summation modules 408 are each adapted to receive inputs, perform an addition operation, and output a result. In an embodiment, summation module 408-A receives data and/or signals indicative of values of the outputs of subtraction-differentiation module 402, negation module 404, and logarithm-subtraction-differentiation module 406 and a previous rigorously calculated value 414. Similarly, summation module 408-B receives data and/or signals indicative of a value of the output of subtraction-differentiation module 402 and a previous rigorously calculated value 414 (e.g., a simple-linear set of first-order terms). In another embodiment, summation module 408-C receives data and/or signals indicative of a value of the outputs of logarithm-subtraction-differentiation module 406 and the previous rigorously calculated value 414 (e.g., a super-linear approximate set of first-order terms). Each summation module 408 performs an addition (i.e., summation) operation on the received values and then provides data and/or a signal indicative of the result as an output value. In an embodiment, the addition operations performed by summation modules 408 are accomplished by processor 202 executing processor-executable instructions that comprise local thermo module 220. In another embodiment, the addition operations performed by summation modules 408 are accomplished by circuits including resistors and an op-amp configured as summing amplifiers, as will be apparent to one skilled in the art. In an embodiment, the result of an addition operation performed by summation module 408-B is referred to as a simple-linear value and the result of an addition operation performed by summation module 408-C is referred to as a super-linear approximate value.

The magnitude modules 410 are each adapted to receive inputs, perform a magnitude (i.e., absolute value) operation, and output a result. In an embodiment, magnitude modules 410 receive data and/or signals indicative of values of the outputs of summation module 408-B and 408-C. The magnitude modules determine the magnitude of the received values (i.e., the non-negative value without regard to sign) and outputs data and/or a signal indicative of the value of the result. The magnitude operations performed by magnitude modules 410 are accomplished in an embodiment by processor 202 executing processor-executable instructions that comprise local thermo module 220. In another embodiment, the magnitude operations performed by magnitude modules 410 are accomplished by circuits including resistors, diodes, and op-amps configured as absolute value amplifiers (e.g., full-wave rectifiers), as will be apparent to one skilled in the art.

The error module 412 is adapted to receive inputs, perform a percent error operation, and output a result. In an embodiment, error module 412 receives data and/or signals indicative of values of the outputs of magnitude modules 410, performs a percent error operation on the values, and outputs data and/or a signal indicative of the value of the result (e.g., error value 314). And the percent error operation performed by error module 412 is accomplished by processor 202 executing processor-executable instructions that comprise local thermo module 220 in accordance with an embodiment of the invention.

Figure 5:
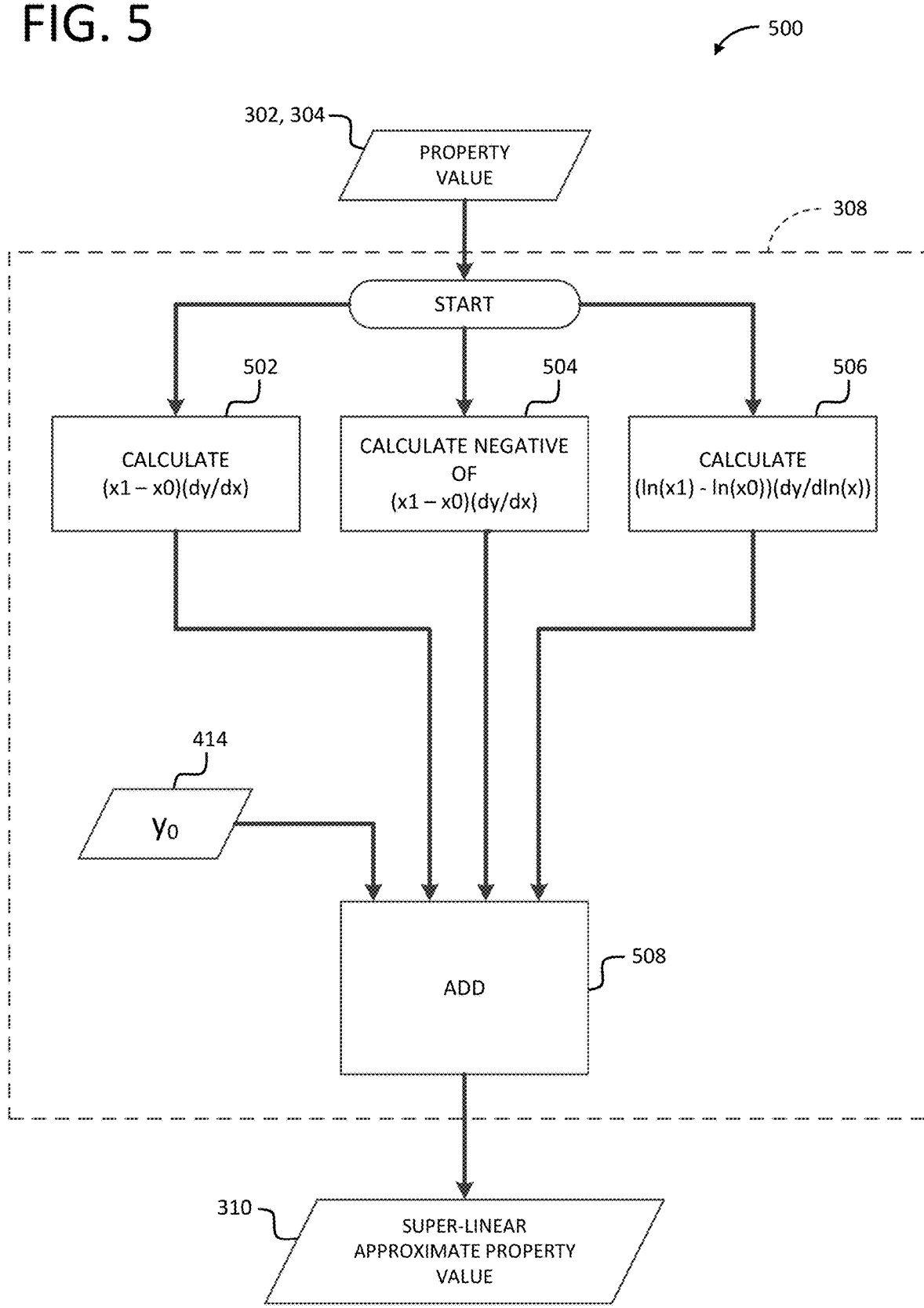
FIG. 5 is an exemplary flow diagram illustrating an operation of a super-linear Taylor series expansion of FIG. 3.

FIG. 5 illustrates a flow diagram of an exemplary super-linear Taylor series expansion process 500 of local thermo module 220 that comprises step 308 (FIG. 3) in accordance with an embodiment of the invention. At step 502, local thermo module 220 calculates the difference (e.g., $x_1-x_0$) between current independent property value 304 (e.g., x1) and previous independent property value 302 (e.g., $x_0$) and then calculates the derivative of the difference (e.g., $(x_1-x_0)(dy/dx)$). At step 504, local thermo module 220 calculates the negative of the derivative of the difference between current independent property value 304 and previous independent property value 302 (e.g., $-(x_1-x_0)(dy/dx)$). At step 506, local thermo module 220 calculates the difference between a logarithm of current independent property value 304 and previous independent property value 302 and then calculates the derivative of the difference of the logarithm values (e.g., $(\ln(x_1)-\ln(x_0))(dy/d\ln(x))$). At step 508, local thermo module 220 adds the results of steps 502, 504, and 506 to a previous rigorously calculated value 414 (e.g., $y_0$) to generate super-linear approximate property value 310.

Figure 6:
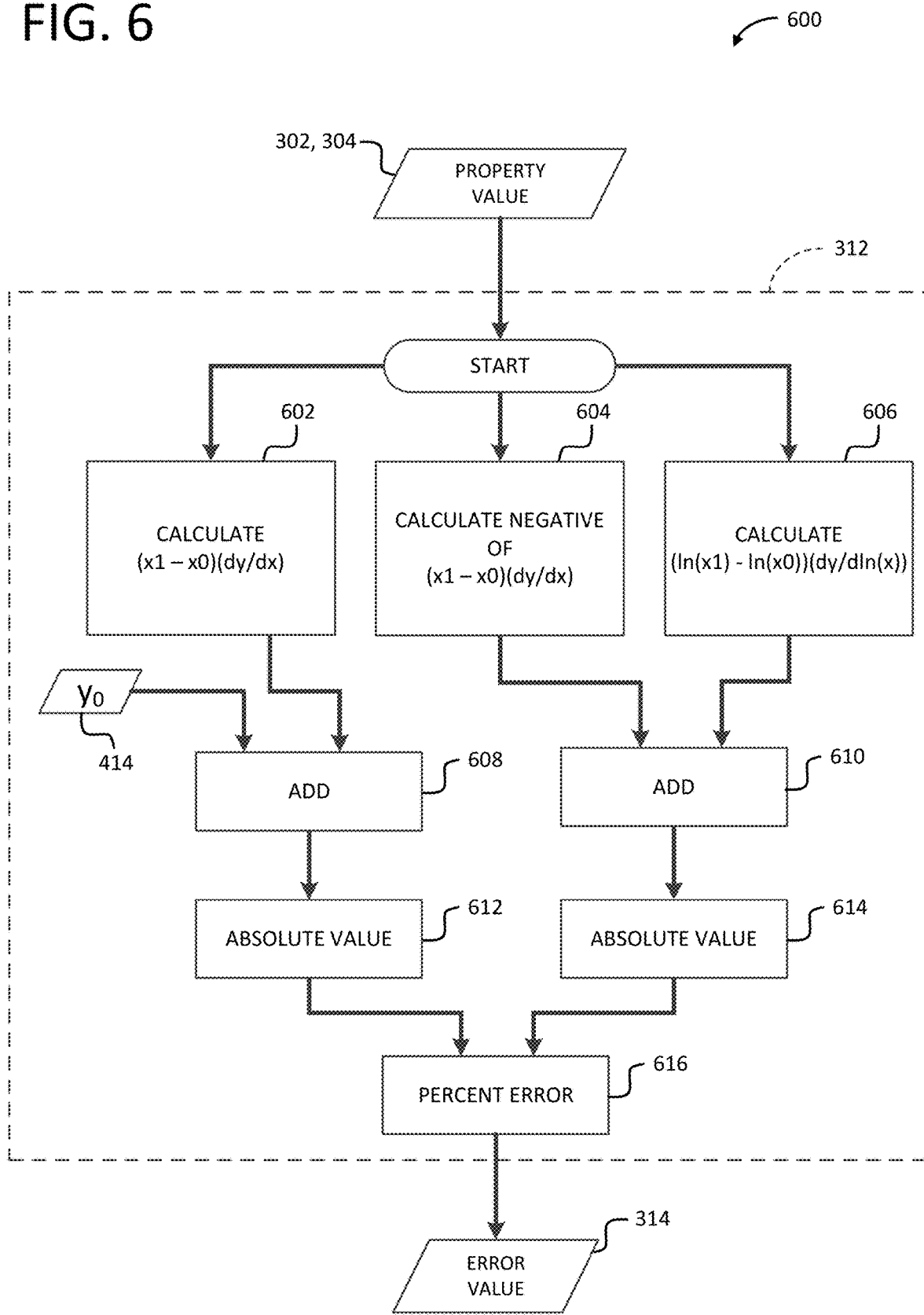
FIG. 6 is an exemplary flow diagram illustrating an operation of an error determination of FIG. 3.

FIG. 6 illustrates a flow diagram of an exemplary super-linear Taylor series expansion error calculation process 600 of local thermo module 220 that comprises step 312 (FIG. 3) in accordance with an embodiment of the invention. At step 602, local thermo module 220 calculates the difference (e.g., $x_1-x_0$) between current independent property value 304 (e.g., $x_1$) and previous independent property value 302 (e.g., $x_0$) and then calculates the derivative of the difference (e.g., $(x_1-x_0)(dy/dx)$). At step 604, local thermo module 220 calculates the negative of the derivative of the difference between current independent property value 304 and previous independent property value 302 (e.g., $-(x_1-x_0)(dy/dx)$). At step 606, local thermo module 220 calculates the difference between a logarithm of current independent property value 304 and previous independent property value 302 and then calculates the derivative of the difference of the logarithm values (e.g., $(\ln(x_1)-\ln(x_0))(dy/d\ln(x))$). At step 608, local thermo module 220 adds the result of step 602 to a previous rigorously calculated value 414 (e.g., $y_0$). At step 610, local thermo module 220 adds the results of steps 604 and 606. At step 612 local thermo module 220 calculates the absolute value of the result of step 608, and at step 614 local thermo module 220 calculates the absolute value of the result of step 610. At step 616, local thermo module 220 calculates the percent error between the results of steps 612 and 614 to generate error value 314.

Figure 7:
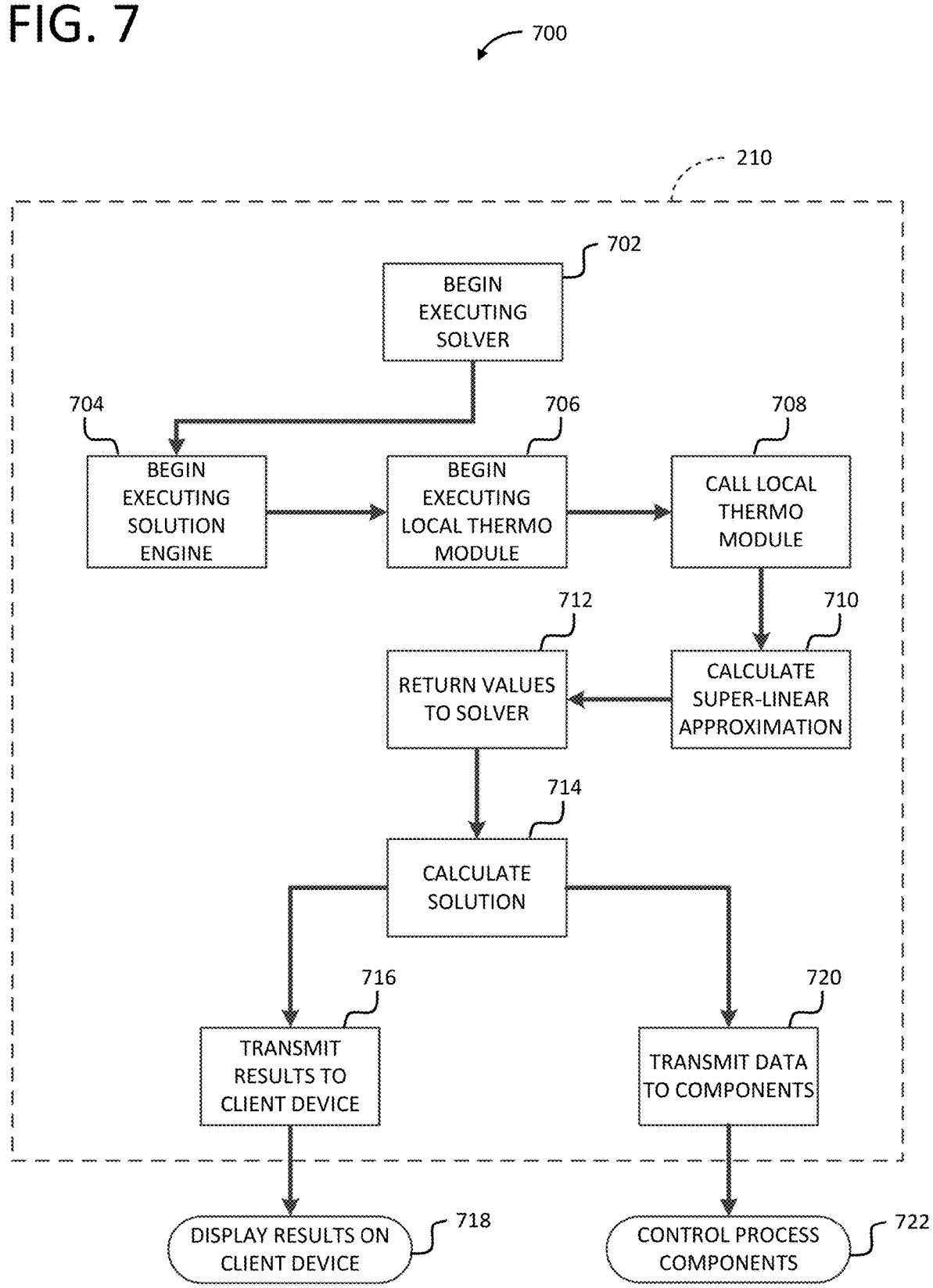
FIG. 7 is an exemplary flow diagram illustrating an operation of the simulation module of FIG. 2.

FIG. 7 illustrates a flow diagram of an exemplary super-linear approximation process 700 of simulation module 210. In the exemplary illustrated embodiment, it is assumed that simulation module 210 has initiated simulation of fluid processing system 120. In this exemplary embodiment, the variables of the top-level equations describing fluid processing system 120 are assumed to have at least been initialized, although the values of such variables may have not yet converged upon a correct solution of the equations. The simulation module 210 begins an execution of solver 216 at step 702, an execution of at least one solution engine 218 at step 704, and an execution of local thermo module 220 at step 706. In an embodiment, step 702 is accomplished by processor 202 executing processor-executable instructions that comprise solver 216, step 704 is accomplished by processor 202 executing processor-executable instructions that comprise solution engine 218, and step 706 is accomplished by processor 202 executing processor-executable instructions that comprise local thermo module 220. During operation, simulation module 210 calls local thermo module at step 708. In an exemplary embodiment, the call includes previous values of an independent property of interest. In another embodiment, the call includes an indication of an independent property of interest.

At step 710, local thermo module 220 calculates a super-linear approximation value of the indicated independent property of interest. In an exemplary embodiment, step 710 comprises super-linear approximation process 300, as further described herein. Upon calculating the super-linear approximated values, local thermo module 220 returns the values to simulation module 210 at step 712. At step 714, simulation module 210 uses the super-linear approximated values to determine a new solution for the values of the variables and repeats the process until simulation module 210 determines that the values of the variables have converged upon a correct solution. In an embodiment, upon completion of step 714, the process advances to step 716 in which simulation device 104 transmits the results to client device 106 and client device 106 displays the results via a graphical user interface at step 718. In another embodiment, upon completion of step 714, the process advances to step 720 in which simulation device 104 transmits data to components of fluid processing system 120 (e.g., process controller 128) for controlling process components (e.g., pump 122, valves 124) at step 722.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
   simulating, using a simulation module, an industrial process, the industrial process using a dynamic equation representing a dynamic property of the industrial process, a status of the dynamic property being at least an initialized status, the dynamic equation being a first-order Taylor series expansion, the dynamic property corresponding to at least one of temperature, pressure and composition, the dynamic equation being a first-order Taylor series expansion;
   determining, using a local module during said simulation, a super-linear approximate value of the dynamic property, wherein the super-linear approximate value is automatically updated during the industrial process;
   determining, using the simulation module, a new solution for the dynamic equation based at least in part on the super-linear approximate value, the determination of the solution comprising:
      determining an error value between the first-order Taylor series expansion and a basic linear first-order Taylor series expansion of the dynamic property; and
      updating the super-linear approximate value with a rigorous value when the determined error value is greater than a predetermined value;
   repeating said determining the new solution steps within the simulation until the simulation module determines that the super-linear approximate value has converged upon a correct solution; and
   controlling, by a process controller, one or more devices executing the industrial process based at least in part on the correct solution.

2. The method of claim 1, wherein the controlling comprises transmitting data to a process controller, and wherein the transmitted data comprises at least in part the determined solution.

3. The method of claim 1, wherein the series expansion comprises a first-order Taylor series expansion in at least one of temperature, pressure, and composition domains.

4. A non-transitory computer-readable storage medium tangibly encoded with computer-executable instructions, that when executed by a processor, perform a method comprising:
   simulating, using a simulation module, an industrial process, the industrial process using a dynamic equation representing a dynamic property of the industrial process, a status of the dynamic property being at least an initialized status, the dynamic equation being a first-order Taylor series expansion, the dynamic property corresponding to at least one of temperature, pressure and composition;

determining, using a local module during said simulation, a super-linear approximate value of the dynamic property, wherein the super-linear approximate value is automatically updated during the industrial process;

determining, using the simulation module, a new solution for the dynamic equation based at least in part on the super-linear approximate value, the determination of the solution comprising:

determining an error value between the first-order Taylor series expansion and a basic linear first-order Taylor series expansion of the dynamic property; and updating the super-linear approximate value with a rigorous value when the determined error value is greater than a predetermined value;

repeating said determining the new solution steps within the simulation until the simulation module determines that the super-linear approximate value has converged upon a correct solution; and controlling, by a process controller, one or more devices executing the industrial process based at least in part on the correct solution.

5. A system comprising:

a processor configured to:

simulate, using a simulation module, an industrial process, the industrial process using a dynamic equation representing a dynamic property of the industrial process, a status of the dynamic property being at least an initialized status, the dynamic equation being a first-order Taylor series expansion, the dynamic property corresponding to at least one of temperature, pressure and composition;

determine, using a local module during said simulation, a super-linear approximate value of the dynamic property, wherein the super-linear approximate value is automatically updated during the industrial process;

determine, using the simulation module, a new solution for the dynamic equation based at least in part on the super-linear approximate value, the determination of the solution comprising:

determining an error value between the first-order Taylor series expansion and a basic linear first-order Taylor series expansion of the dynamic property; and updating the super-linear approximate value with a rigorous value when the determined error value is greater than a predetermined value;

repeat the determining the new solution steps within the simulation until the simulation module determines that the super-linear approximate value has converged upon a correct solution; and control, by a process controller, one or more devices executing the industrial process based at least in part on the correct solution.

* * * * *

UNITED STATES PATENT AND TRADEMARK OFFICE
CERTIFICATE OF CORRECTION

PATENT NO. : 11,221,602 B2  Page 1 of 1
APPLICATION NO. : 14/919887
DATED : January 11, 2022
INVENTOR(S) : Gang Xu It is certified that error appears in the above-identified patent and that said Letters Patent is hereby corrected as shown below:

In the Claims

In Claim 1:
Column 16, Lines 29-30, the text "and composition, the dynamic equation being a first-order Taylor series expansion;" should read -- and composition; --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*